(12) United States Patent
  Whitaker

(10) Patent No.: US 12,699,274 B2
(45) Date of Patent: Aug. 4, 2026

(54) PROTECTING HORSES AND OTHER ANIMALS FROM BLUE LIGHT

(71) Applicant: Beau David Whitaker, Saldo, TX (US)

(72) Inventor: Beau David Whitaker, Saldo, TX (US)

( * ) Notice: Subject to any disclaimer, the term of this patent is extended or adjusted under 35 U.S.C. 154(b) by 835 days.

(21) Appl. No.: 16/501,930

(22) Filed: Jul. 5, 2019

(65) Prior Publication Data

US 2020/0018982 A1      Jan. 16, 2020

Related U.S. Application Data

(60) Provisional application No. 62/764,029, filed on Jul. 14, 2018.

(51) Int. Cl.

| | |
|---|---|
| *A01K 13/00* | (2006.01) |
| *G02B 27/10* | (2006.01) |
| *G02B 5/00* | (2006.01) |
| *G02B 5/22* | (2006.01) |

(52) U.S. Cl.
  CPC ............ *G02B 27/10* (2013.01); *A01K 13/006* (2013.01); *G02B 5/003* (2013.01); *G02B 5/22* (2013.01)

(58) Field of Classification Search
  CPC ...... A01K 13/006; A01K 21/00; A01K 29/00; G02B 27/10; G02B 5/003; G02B 5/22; G02B 5/223; B68C 5/00; G02C 7/104
  See application file for complete search history.

(56) References Cited

U.S. PATENT DOCUMENTS

| | | | | |
|---|---|---|---|---|
| 2,407,029 | A * | 9/1946 | Miller ...................... | B68B 1/10 |
| | | | | 54/80.2 |
| 4,178,742 | A * | 12/1979 | Longfellow ......... | A01K 13/006 |
| | | | | 54/80.2 |
| 4,756,145 | A * | 7/1988 | Pelling ................. | A01K 13/006 |
| | | | | 54/80.2 |
| 5,177,509 | A * | 1/1993 | Johansen ............... | G02C 7/104 |
| | | | | 351/44 |
| 7,520,607 | B2 * | 4/2009 | Casper .................. | A61M 21/00 |
| | | | | 600/545 |
| 7,721,350 | B1 * | 5/2010 | Eaton ........................ | A61F 9/04 |
| | | | | 2/15 |
| 7,748,845 | B2 * | 7/2010 | Casper ................. | A61N 5/0618 |
| | | | | 351/159.6 |
| 8,894,696 | B2 * | 11/2014 | Hurst .................... | A61M 21/02 |
| | | | | 607/90 |
| 2002/0159026 | A1 * | 10/2002 | Bernheim .............. | G02C 7/102 |
| | | | | 351/159.63 |
| 2010/0083914 | A1 * | 4/2010 | Amaya .................... | B68B 7/00 |
| | | | | 119/850 |
| 2012/0008217 | A1 * | 1/2012 | Ishak .................... | A61Q 17/04 |
| | | | | 359/722 |

(Continued)

FOREIGN PATENT DOCUMENTS

| | | | | |
|---|---|---|---|---|
| CA | 1322678 | C * | 10/1993 | ............. G02C 7/104 |
| CA | 2352058 | A1 * | 5/2001 | ............... C09D 5/32 |

(Continued)

*Primary Examiner* — Ebony E Evans
(74) *Attorney, Agent, or Firm* — Gregory Perrone

(57) ABSTRACT

Masks and goggles having lens that block blue light from the eyes of animals to provide for better rest and to increase their melatonin levels are disclosed. Methods of using the blue light blocking masks and goggles to block blue light and even longer wavelengths of light are also disclosed.

5 Claims, 14 Drawing Sheets

(56) References Cited

U.S. PATENT DOCUMENTS

| | | | | |
|---|---|---|---|---|
| 2012/0036816 A1 * | 2/2012 | Gilligan | ............... | A01K 13/006 |
| | | | | 54/80.2 |
| 2013/0119886 A1 * | 5/2013 | Hurst | ..................... | H05B 47/10 |
| | | | | 315/246 |
| 2013/0333339 A1 * | 12/2013 | Brown | ................. | A01K 13/006 |
| | | | | 54/80.2 |
| 2014/0107737 A1 * | 4/2014 | Murphy | ................. | A01K 29/00 |
| | | | | 607/90 |
| 2015/0113923 A1 * | 4/2015 | Wood | .................. | A01K 13/006 |
| | | | | 54/80.2 |
| 2016/0223839 A1 * | 8/2016 | Kakinuma | ............. | G02C 7/108 |

FOREIGN PATENT DOCUMENTS

| | | | | | | |
|---|---|---|---|---|---|---|
| CN | 103261949 A | * | 8/2013 | ............. | G02C 7/108 |
| DE | 202014001377 U1 | * | 4/2014 | .............. | B68B 7/00 |
| FR | 2465408 A1 | * | 3/1981 | ........... | A01K 13/006 |
| FR | 2850962 A1 | * | 8/2004 | ........... | A01K 13/006 |
| GB | 2464798 A | * | 5/2010 | .............. | B68B 1/10 |
| WO | WO-2006023006 A2 | * | 3/2006 | .............. | G02C 7/04 |
| WO | WO-2018154024 A1 | * | 8/2018 | ............. | A61D 99/00 |

* cited by examiner

Figure 6 shows that the amber vinyl blocks 100% of light wavelengths between 400 and 510 nm and 40% at 525 nm. Light transmission increases to 80% at 565 nm.

FIG: 10
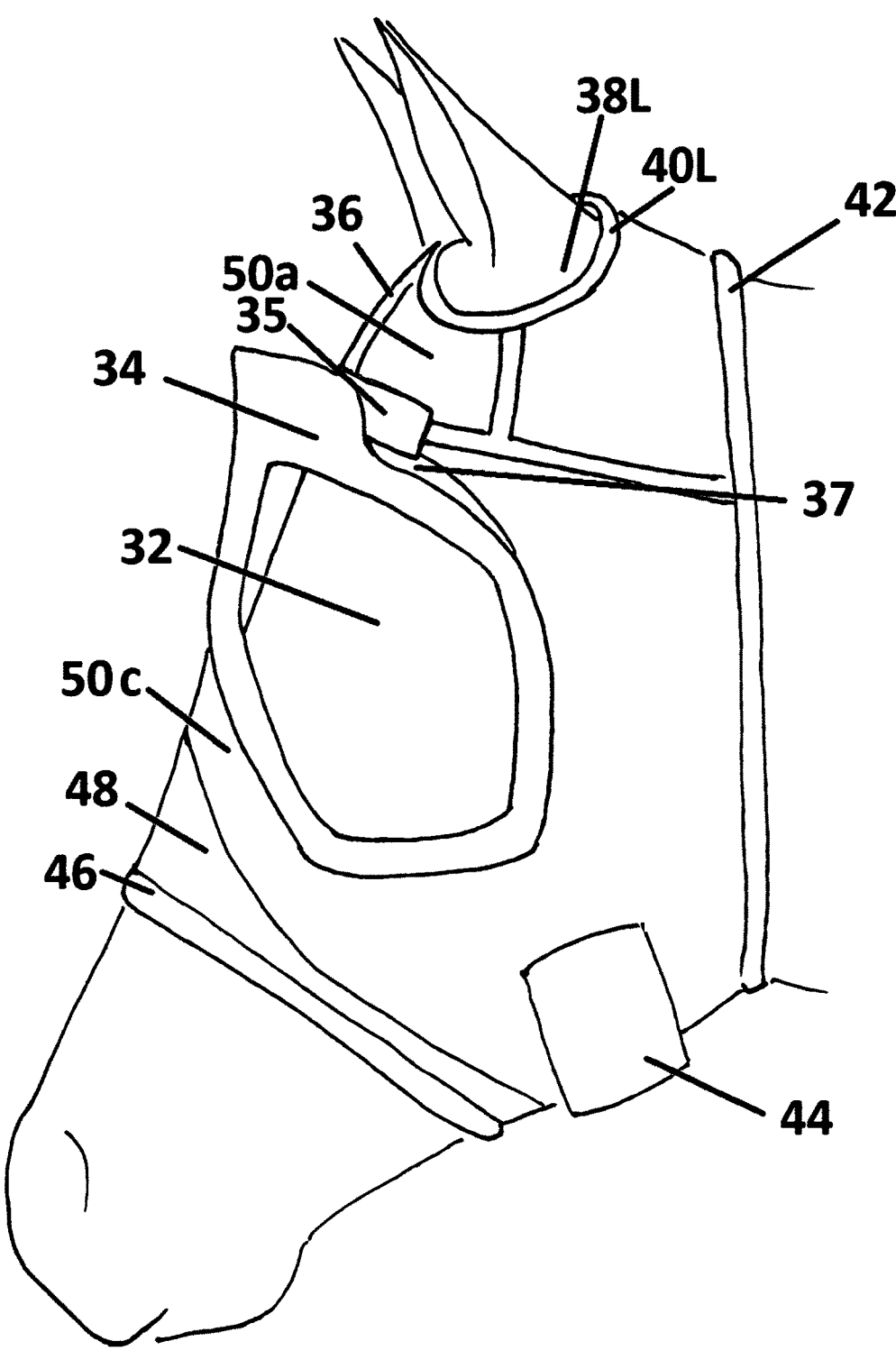

FIG: 11
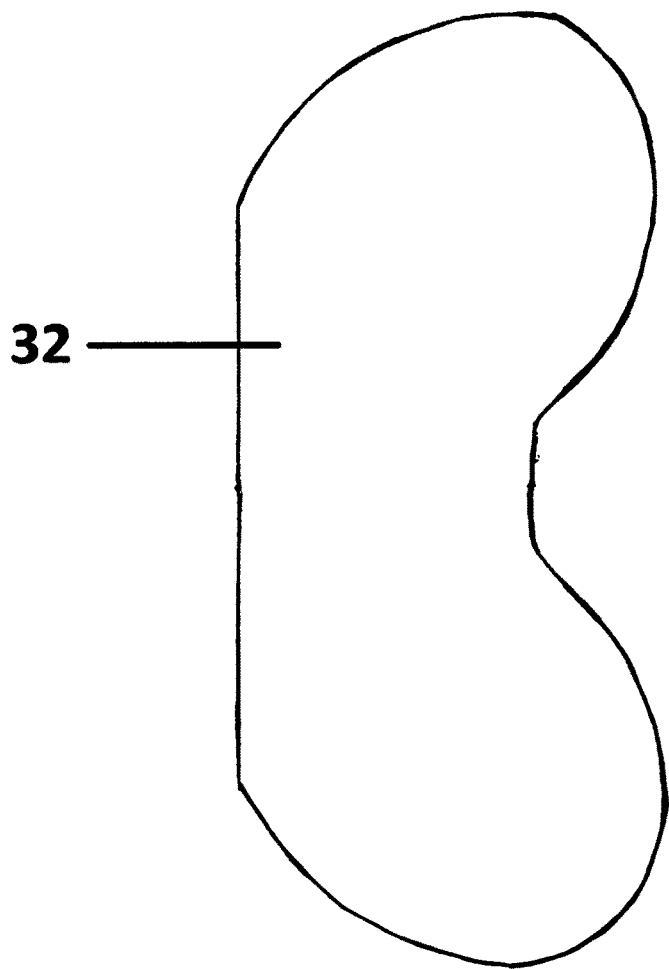

FIG: 12
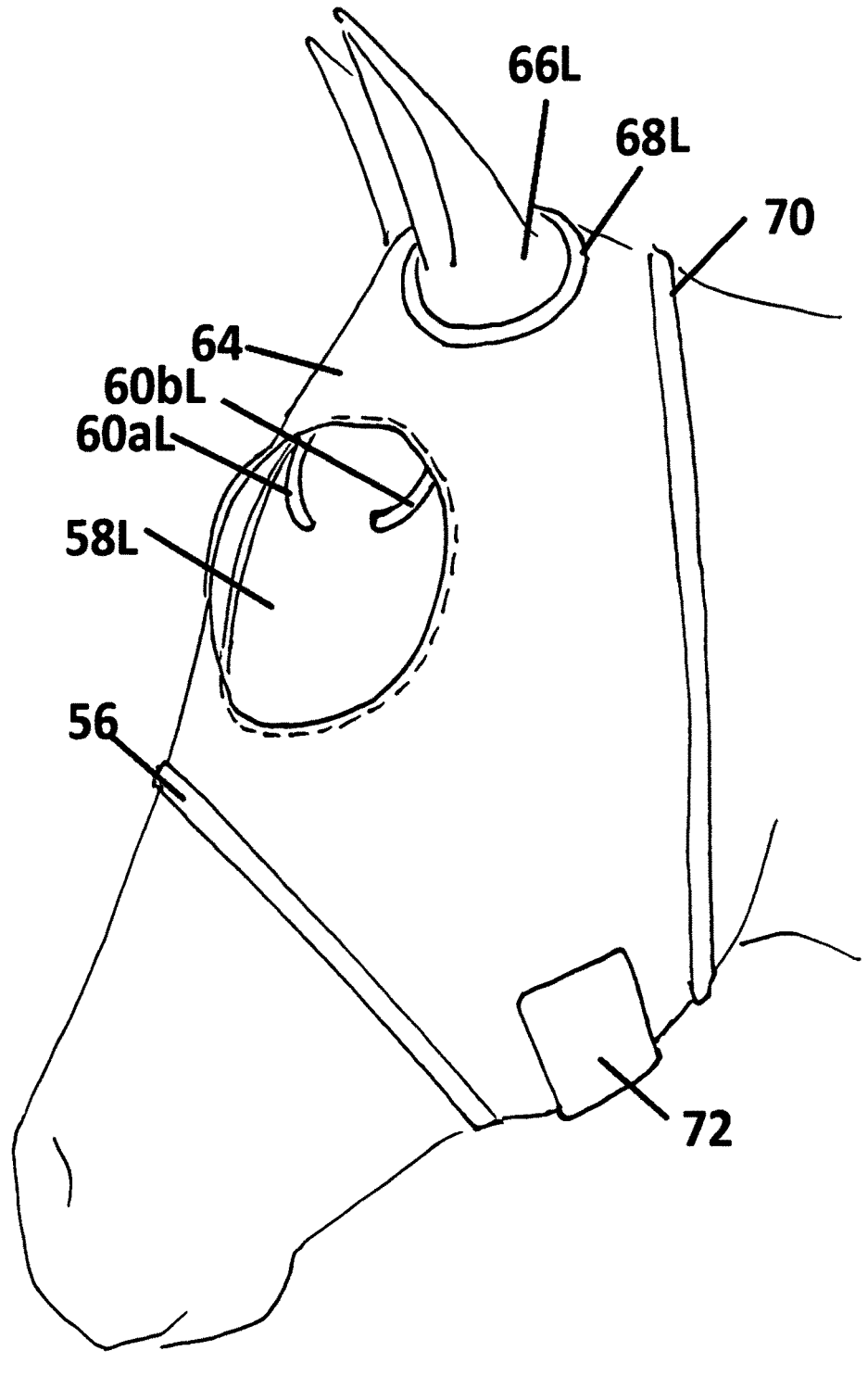

FIG:13
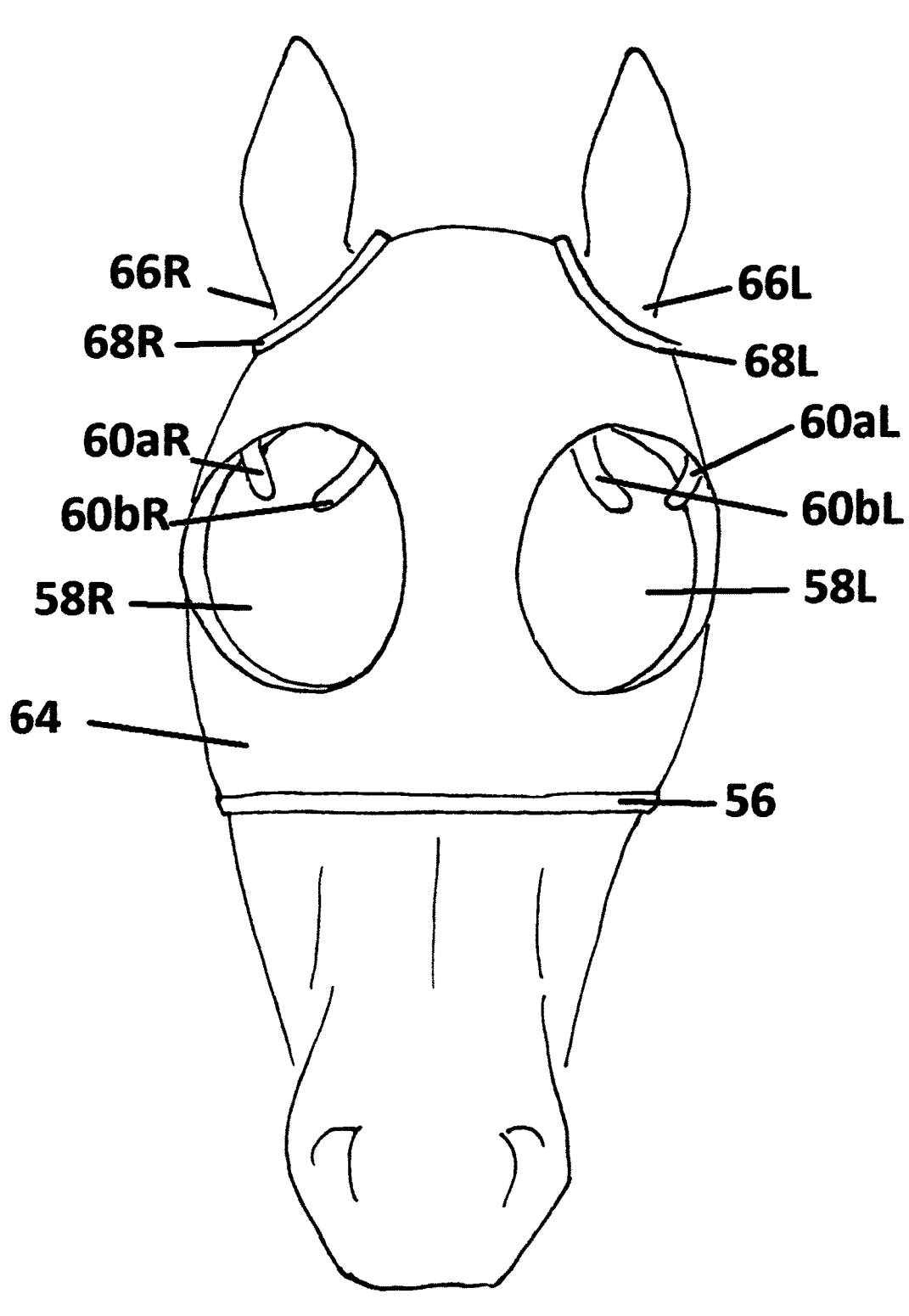

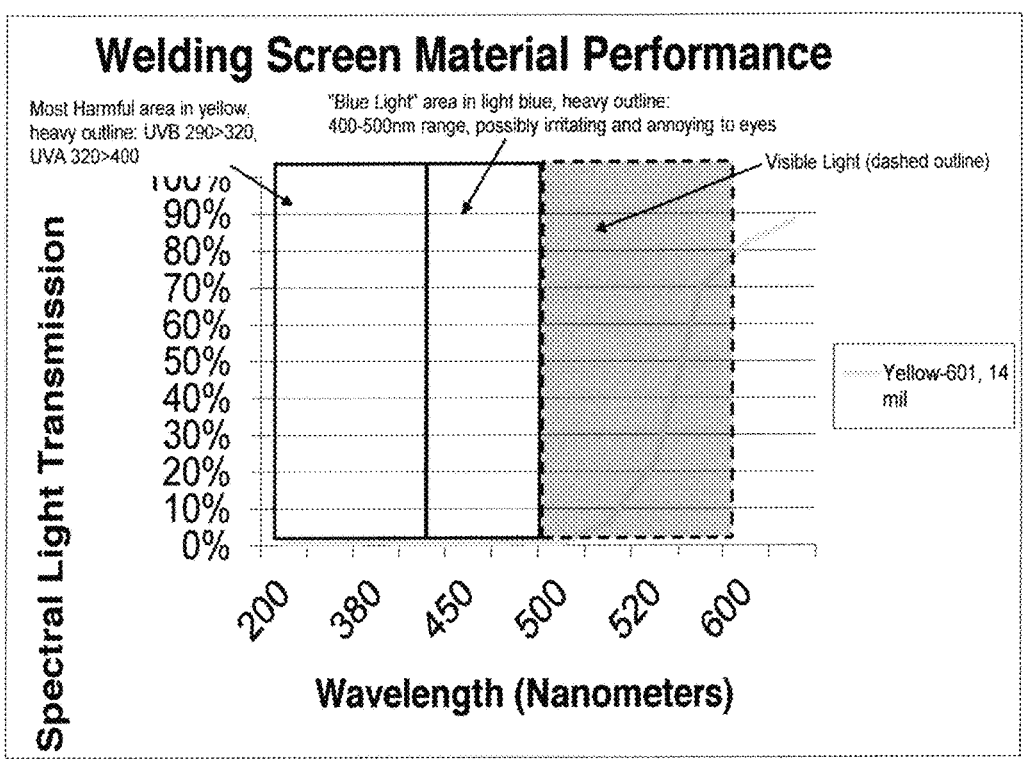

Spectral Light Transmission- Amount of a light ray that is allowed to pass through. 0% means 100% blocked, 100% is like looking through a clear lens
Wavelength- How the light is measured
Ultraviolet light- Light that is not able to be seen by the eye. Some of this light is harmful and some is not. The graph highlights the harmful areas

Explanation

1. The eye can only see in the red shaded area: 500-700nm. Light rays here are not dangerous.
2. The area from 200-400nm cannot be seen by the eye but is the most potentially dangerous.
3. The goal is to block as much of these harmful rays as possible in the 200-400nm range (yellow shaded area).
4. Tillman 601 blocks 99% of the most harmful rays
5. The area from 400-500nm is called "blue light". This area is on the border of light that can be seen and can cause eye irritation.
   Here the Tillman 601 curtain blocks 99%+ of these rays

Figure 14

PROTECTING HORSES AND OTHER ANIMALS FROM BLUE LIGHT

This application claims the benefit of Provisional Application No. 62/764,029 filed Jul. 14, 2018.

BACKGROUND

It is known to filter blue light and other kinds of light coming from computer screens, overhead electric lights and the like using filters that are commercially available to protect the eyes of humans using the computers to avoid visual stress, eye strain and possible long term serious eye defects. Commercial products to cover the computer screens and glasses for people to wear are available, e.g. see the Amazon, lowbluelight website.

It is also known to shine blue light on horse mares' eyes to improve breeding success as offered in The Horse website, and the equilume website. One of the largest commercial uses of blue blocking screens and glasses are recommended to humans for use at in late day when they are exposed to sunlight and/or exposed to a computer screen and/or bright light to improve their rest and sleep during the night.

SUMMARY OF THE INVENTION

It has now been discovered that blocking, or partially blocking blue light from entering the eyes of non-human animals, e.g. equine animals including horses, at various times and for various periods of time affects the production of melatonin in the animals and produces various useful results. One such useful result is allowing the animals to rest better and to relax more when the animals are in stalls or pens under electric lights, particularly in stables or buildings at horse shows, fairs, and similar events, allowing melatonin to rise in its natural rhythm at night. It allows the horses to get more and better rest and sleep producing better performance of the horses the next day. It is believed that blocking all, or much of the blue light, beginning at about 400 nanometers and extending to as high as about 575 or at least 525 and at least 510 nanometers, from animal's eyes with a material that blocks most or all of the blue light from reaching their eyes manipulates their melatonin level and produces the desired effect and results in the animal's, horse's performance the next day. Doing so at other times and for other periods of time produces other useful results as will be described below.

A preferred method of doing this is using a mask, goggles or screen of the invention that blocks out all or most of the blue light included in the light coming from the overhead lights, or sunshine, from their eyes, e.g. from horses eyes, particularly at times in which their performance soon afterward is important. The masks can also be used to treat animals suffering from International travel, e.g. jet lag, to allow them to get more rest and better sleep while they are adjusting to the new day/night cycle, the new photoperiod. This kind of treatment also can enhance breeding, treat a shaking syndrome and other ailments.

Blue light suppresses the melatonin level in the animal, e.g. in equine such as horses, etc. Melatonin is a hormone made by the pineal gland, a pea-sized gland found above the brain. It is thought to be active in regulating the reproductive cycle and it helps humans to know when to wake and when to sleep. It is formed by the pineal gland according to the body's circadian rhythm and the amount of light the body is exposed to each day.

The wave-lengths of the blue light desired to be blocked or filtered out is from about 400 nanometers to about 575 nanometers, preferably from about 400 to about 510 or about 525 nanometers and most preferably from about 425 to about 495 nanometers, and any range within these ranges. The invention includes methods of blocking or filtering out this blue light for various times, at various times in a day, month and year, equipment for doing so, like masks, goggles, screens and the like and for various reasons are all parts of the invention.

The mask of the invention preferably has ways of preventing the blue light blocking or filtering lens or membrane from being pushed into the animal's eyes, e.g. a triangular or other shaped structure to raise and hold the membrane or lens further away from the eyes, or by using cup shaped membranes or lens that are far less likely to be pushed into an animal's eyes.

The blue light filtering or blocking masks, goggles, screens or the like and methods can also be used from mid-summer to shorten estrous and speed up winter anestrous by increasing melatonin production in the animal or horse earlier in the light period mimicking day lengths of October. Once the animals, e.g. horse mares have been consistently exposed to "short days" produced by the blue light blocking or filtering devices of the invention, they can then be exposed to "long days" by removing the blue light blocking or filtering device and putting the horse under lights at night hastening the onset of estrous the upcoming year.

Another potential benefit of the invention is the use of a blue light blocking or filtering device on a horse to stop or reduce the spring onset of "head shaking syndrome" many horses suffer from. This method comprises applying the blue light blocking mask in the afternoon and removing it the next morning to mimic the short day photoperiod as the long day photoperiod commences in the spring.

Herein, when a range of number values is disclosed it is to be understood by those of ordinary skill in the appropriate art(s) that each numerical value in between the upper limit and the lower limit of the range is also disclosed, to at least 0.01 of a full number. Thus in a range of 1 to 10, this includes 2 to 10, 3. to 8 or 8.50, and so on. The addition of a new limitation in a claim previously stating from 2 to 7 changing it to from 3-7 or 4-6 would not introduce new matter whether those new ranges were specifically disclosed in the specification or not because of this explanation of the meaning of a disclosed broader range, such as 1-10. This meaning of a range is in keeping with the requirement in 35 USC 112 that the disclosure be concise.

Further, when the word "about" is used herein it is meant that the amount or condition it modifies can vary some beyond that stated so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors' disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term "about" as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

BRIEF DESCRIPTION OF THE DRAWINGS and PHOTOS

FIG. 10 is an opposite side view of the goggles of FIG. 7, showing the opening and hook and loop closure allowing easy insertion and removal of the mask lens or material.

FIG. 11 is a plan view of the lens or blue light blocking piece used to cover the eye holes in the goggles of FIGS. 7-10.

FIG. 12 is a side view of another horse mask of the invention.

FIG. 13 is a front view of the mask shown in FIG. 12.

FIG. 14 is a chart showing the blue light blocking performance of one of the blue light blocking materials used in the mask of FIGS. 1-5.

DETAILED DESCRIPTION OF THE INVENTION AND BEST MODE

While the invention is applicable to many types of animals, especially large animals and show and zoo animals of any size, it will be described here as applied to Equine animals, particularly to horses. First, it will be described as applied to horses, particularly show horses, race horses or other horses that will need top performance the next day or hours following treatment with the masks, goggles, or other equipment using the inventive concepts. However, it is applicable to any horses, other equine and other animals.

Figure 1:
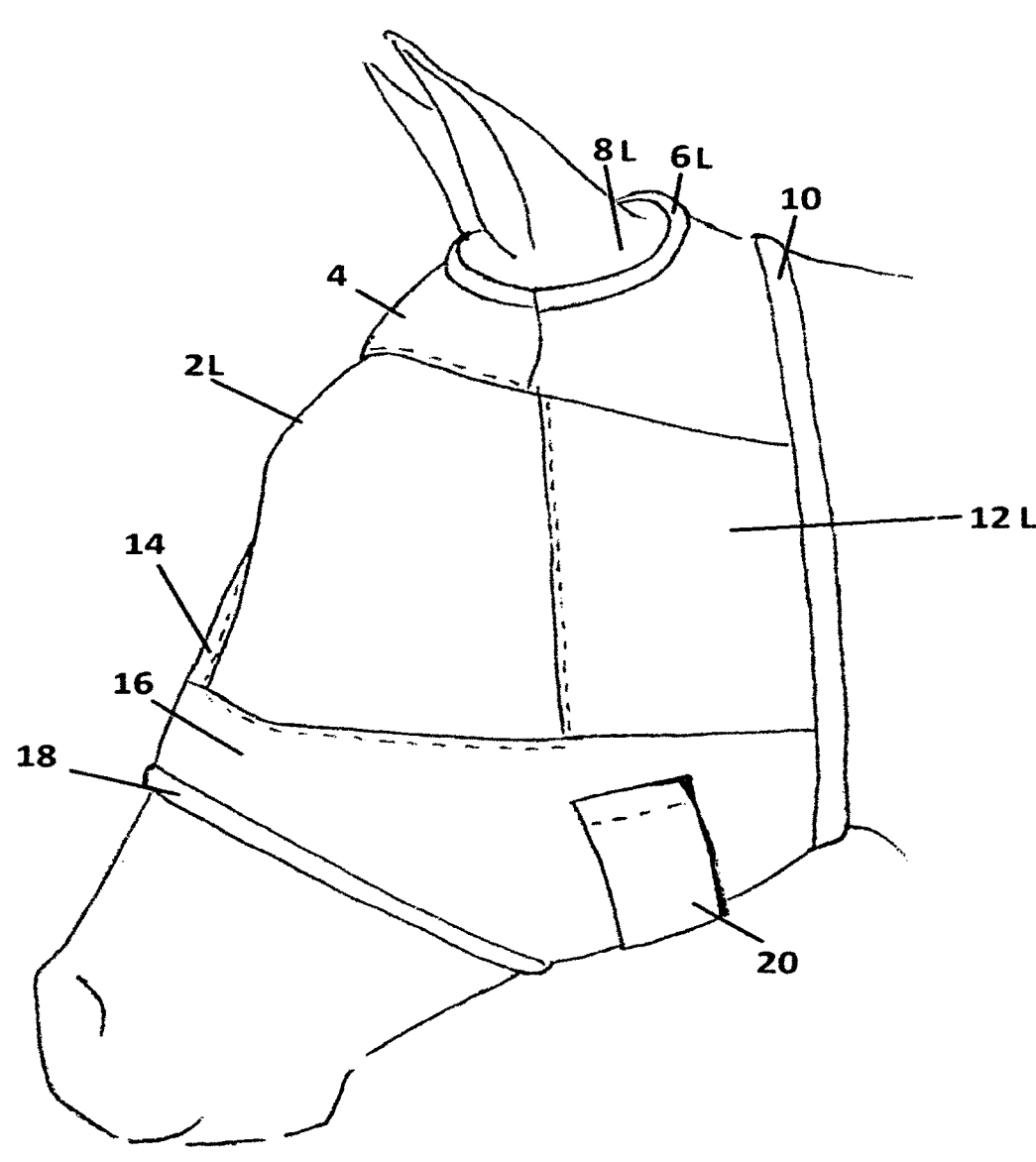
FIG. 1 is a side view of a head of a horse wearing a mask of the invention.
Figure 2:
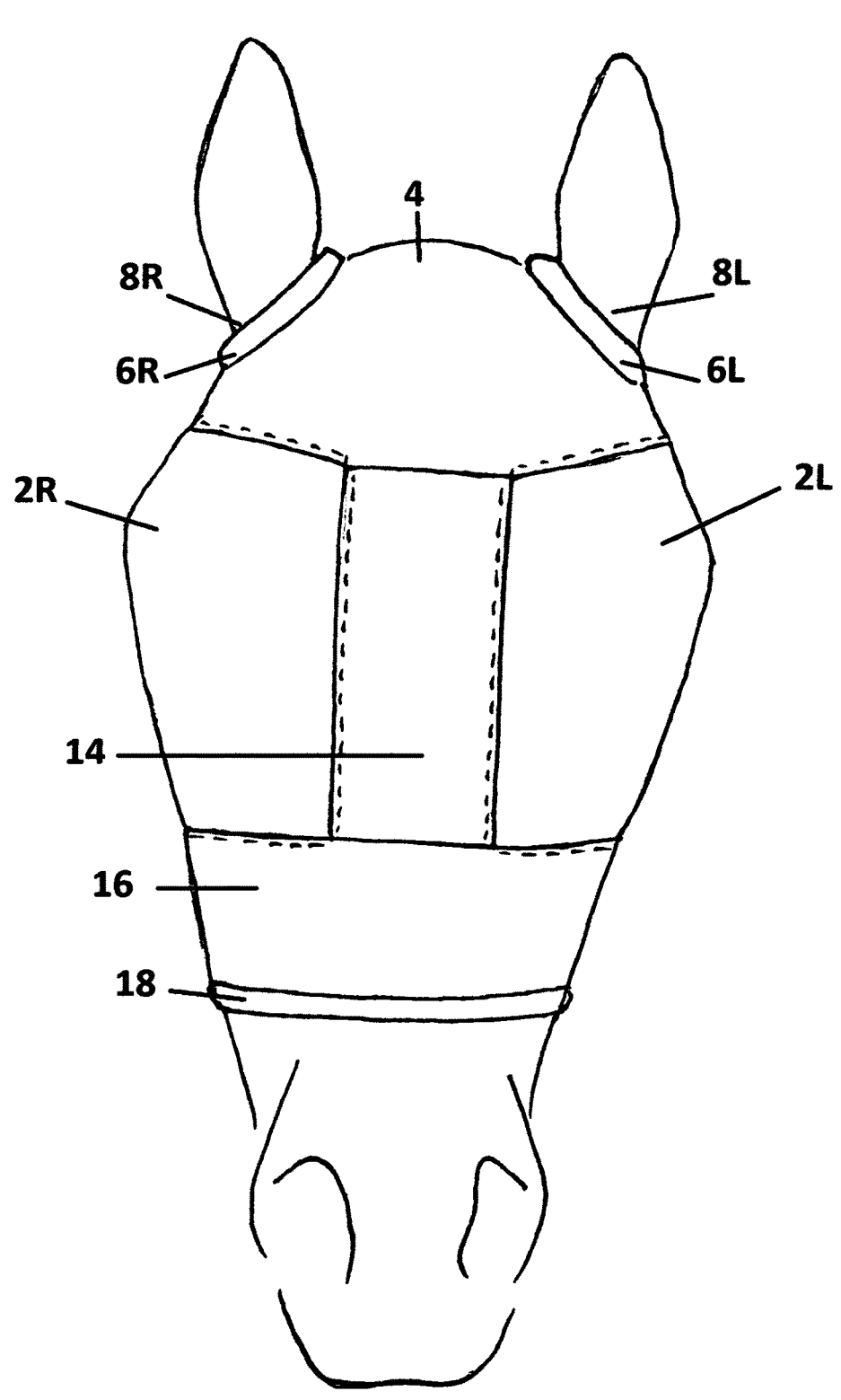
FIG. 2 is a front view of the head of a horse wearing an optional modification of the mask of FIG. 1.

One type of mask according to the invention is shown in FIGS. 1 and 2 placed on a horse. The mask 1 is comprised of a flexible material, preferably an open weave cloth or polymer material like a 2.5 oz., 75 denier micromesh, breathable polyester stitched together in a well known normal manner. The mask 1 is comprised of blue blocking lens or sheet material like vinyl, polycarbonate, acrylic like Plexiglass®, (PMMA), Polymethyl methacrylate, suspended over the eyes of the horse, preferably an amber colored 14 mil yellow colored polyvinyl chloride from LowBlueLights.com. If any of these materials do not contain a blue blocking material, a coating is applied to one face, the coating being colored amber or orange to block the blue light

Figure 4:
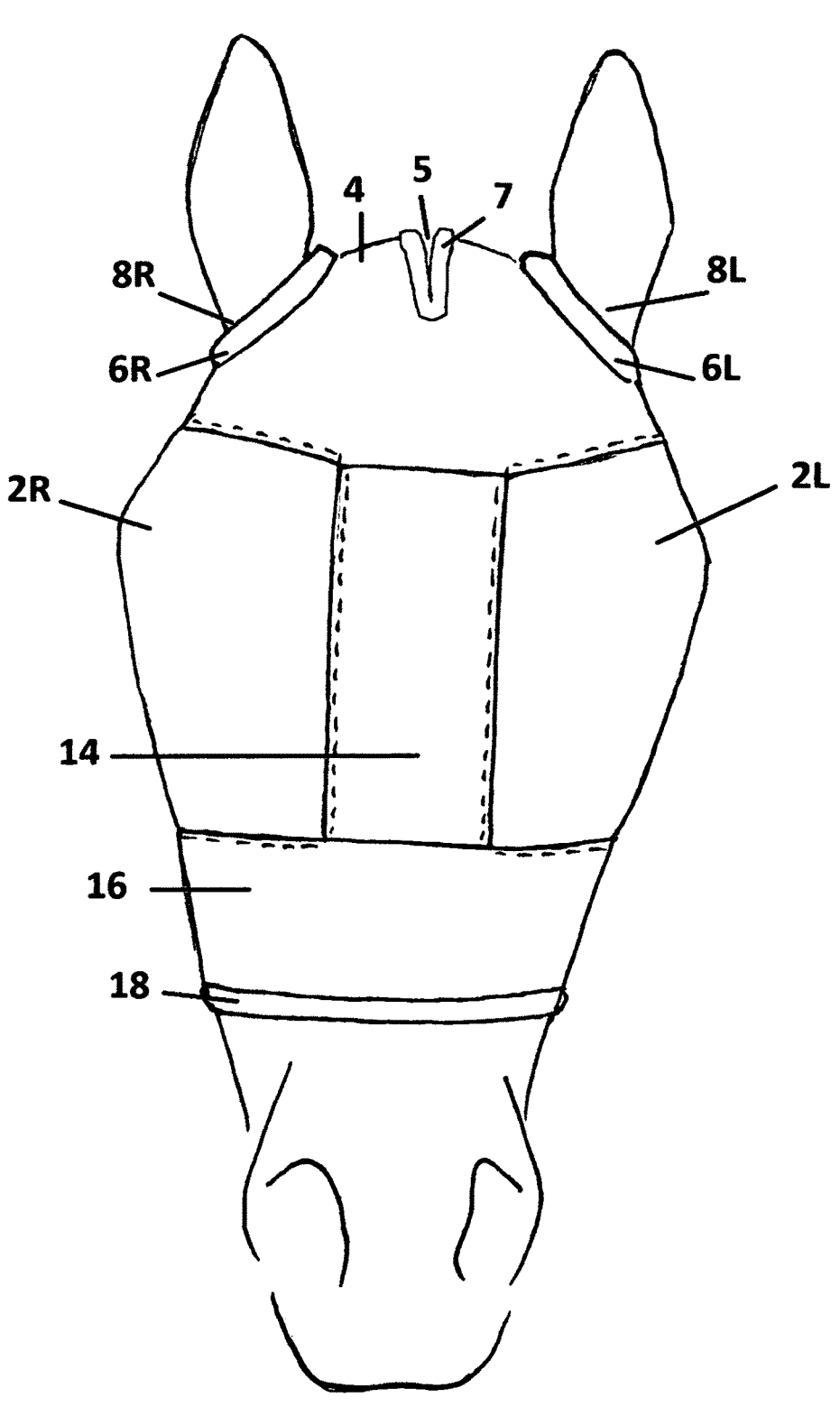
FIG. 4 is a side view of the mask shown in FIG. 1 above.

4 waves, preferably an amber colored, about 14 mil or heavier amber colored polyvinyl chloride like that from Tillman (the John Tillman Co.), or from theILowbluelights.com website. FIG. 4 is a graph showing the blocking and filtering performance of the Tillman panels 2L and 2R in the mask. The visibility through 14 mil (0.0014 inch) thick Tillman blue light blocking material, and of 40 mil thick of material from the same source is shown in Photos 3 and 4 with the visibility being significantly better through the 14 mil material than through the 40 mil material, but the latter is also suitable for some applications. Suitable thicknesses of the blue light blocking material are from about 5 mil to about 50 mil with a preferred thickness being from about 10 mils to about 45 to 50 mils or thicker, and as used herein 14 mils was very suitable where the animal needed good visibility. This product can block about 100% of wavelengths of light form 400 nm to 510 nm, about 40% from 510 to 525 nanometers and partially blocks wavelengths from 525 nm to 575 nm. The graph in FIG. 6 shows the blocking of blue light and extending partially into the green light spectrum and the chart of FIG. 14 shows further blocking efficiency for this product.

The mask 1 is also comprised of openings 8L and 8R for the ears to pass through and having soft borders 6L and 6R to avoid irritating the ears, made preferably from a 13.5 oz. polyester double sided artic fleece. A top section 4 covering the forehead, preferably made from a 2.5 oz. 75 denier polyester Micro Mesh breathable material, an optional additional opening 5 for a forelock of mane to pass through, this opening having a soft border 7 like 6L and 6R. The mask 1 further comprises a front piece 14, preferably made from a 7.5 oz. cotton twill fabric with side pieces 12L and 12R (not shown) preferably made from the same material as the center panel 14. A lower piece 16 having a soft border 18 like the other soft borders 7 and 8L and 8R. Finally to hold the mask 1 onto the head of a horse a band 20 going under the horse's head and having a Velcro® fastener 21 on its free end. This type of mask can also be used on a pony, mule, donkey, camel, and like animals.

Figure 3:
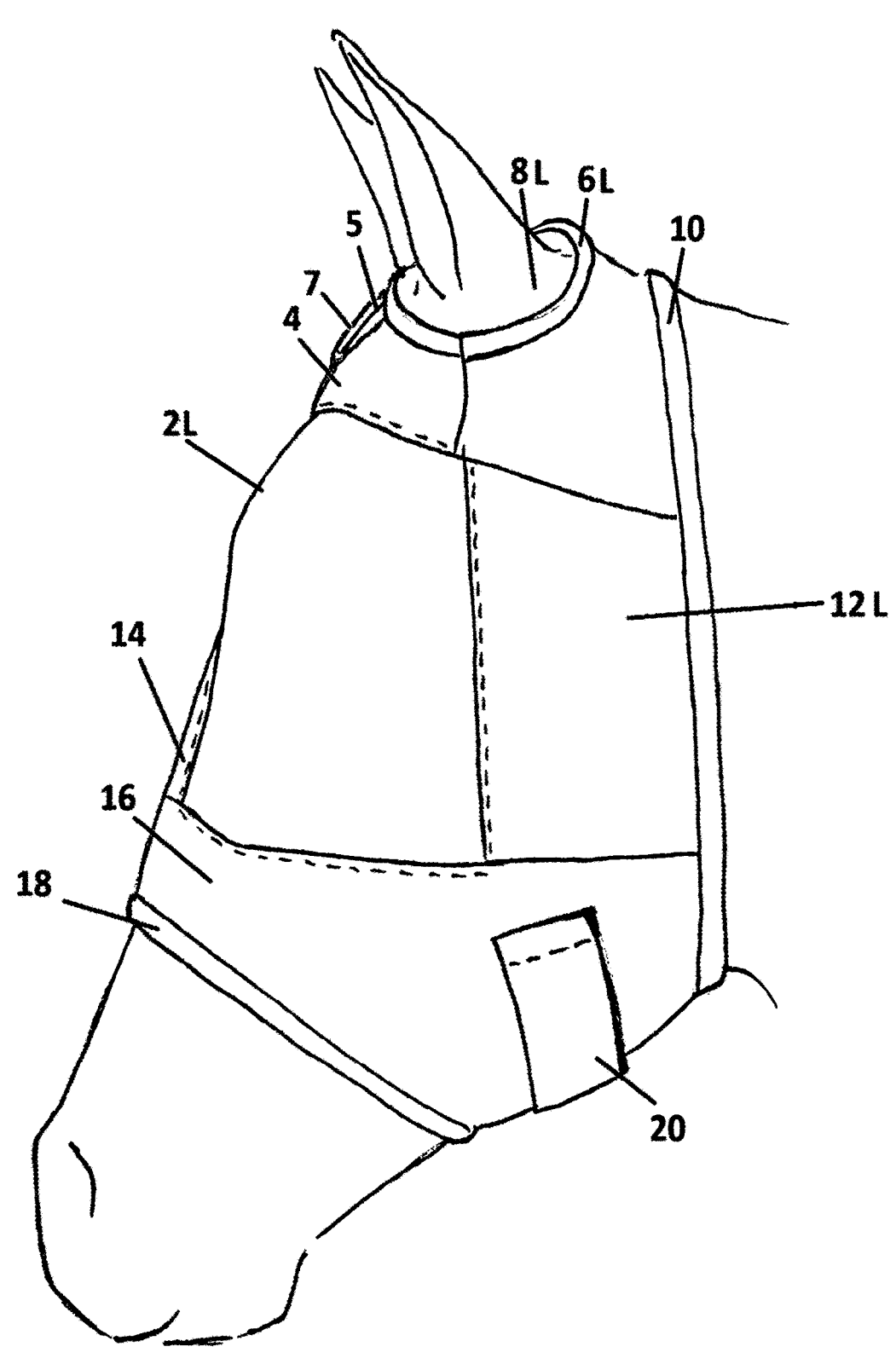
FIG. 3 is a side view of the horse wearing of the mask shown in FIG. 2.
Figure 5:
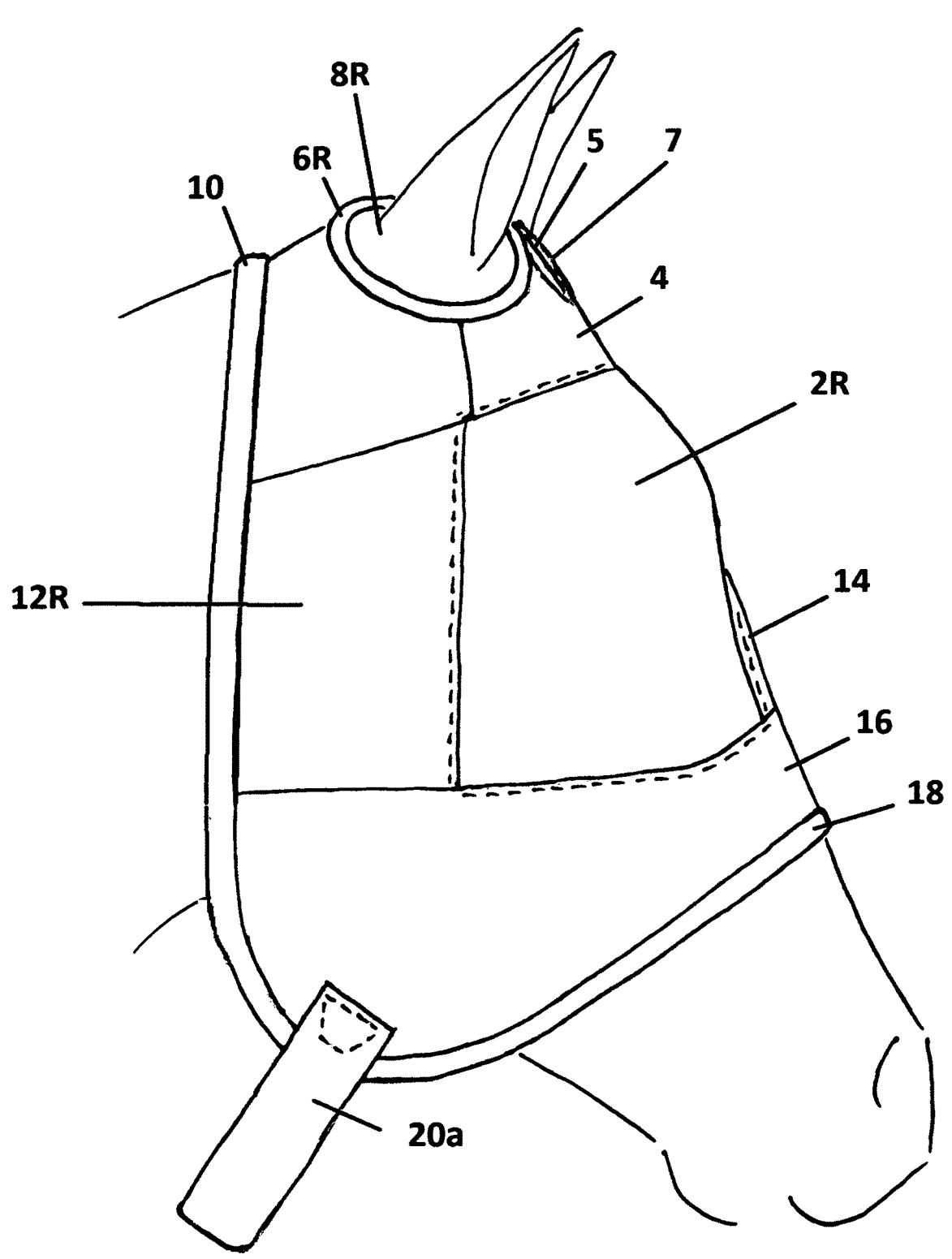
FIG. 5 is an opposite side view of the mask shown in FIGS. 2 and 3.

The mask in FIG. 3 is similar to the mask in FIG. 1 but adds the optional opening 5 for a forelock of mane of the horse in the, top piece 4 having a border 7 around the edge of the opening 5. This border 7, as well as the other borders 6L, 6R, 10 and 18 are made preferably with a fleece material by folding this material over and sewing one edge to the top edge of the material forming the opening or the border, and sewing the other edge to the bottom edge of the material forming the opening or edge of the mask. FIG. 5 shows the opposite side of the mask shown in FIG. 1, showing how the strap 20 is sewed to the bottom panel 16 of the mask 1. The enclosed photos show an example of the mask described above.

Figure 6:
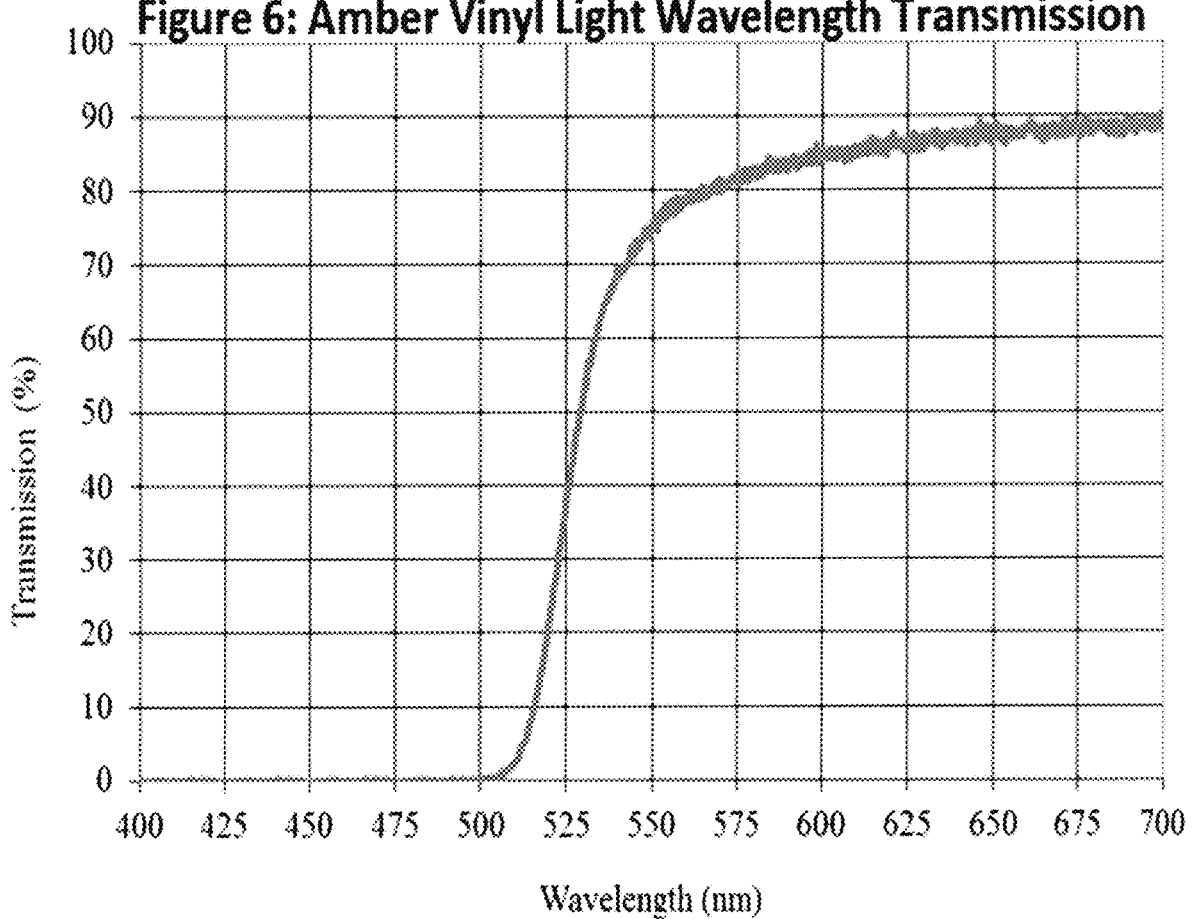
FIG. 6 is a graph showing the performance of the eye covering material covering the eye-holes in the mask shown in FIGS. 1-4 and 5.

FIG. 6 is a graph showing the blue light blocking performance of the blue light blocking material used in to cover the eye holes in the masks shown in FIGS. 1-5, also that can be used in goggles as shown in FIGS. 7-10. As shown, light waves having a wavelengths beginning about 400 nanometers (nm) and extending up to about 505-510 nm are totally blocked and then on up to about 520 nm are at least 80% blocked.

Figure 7:
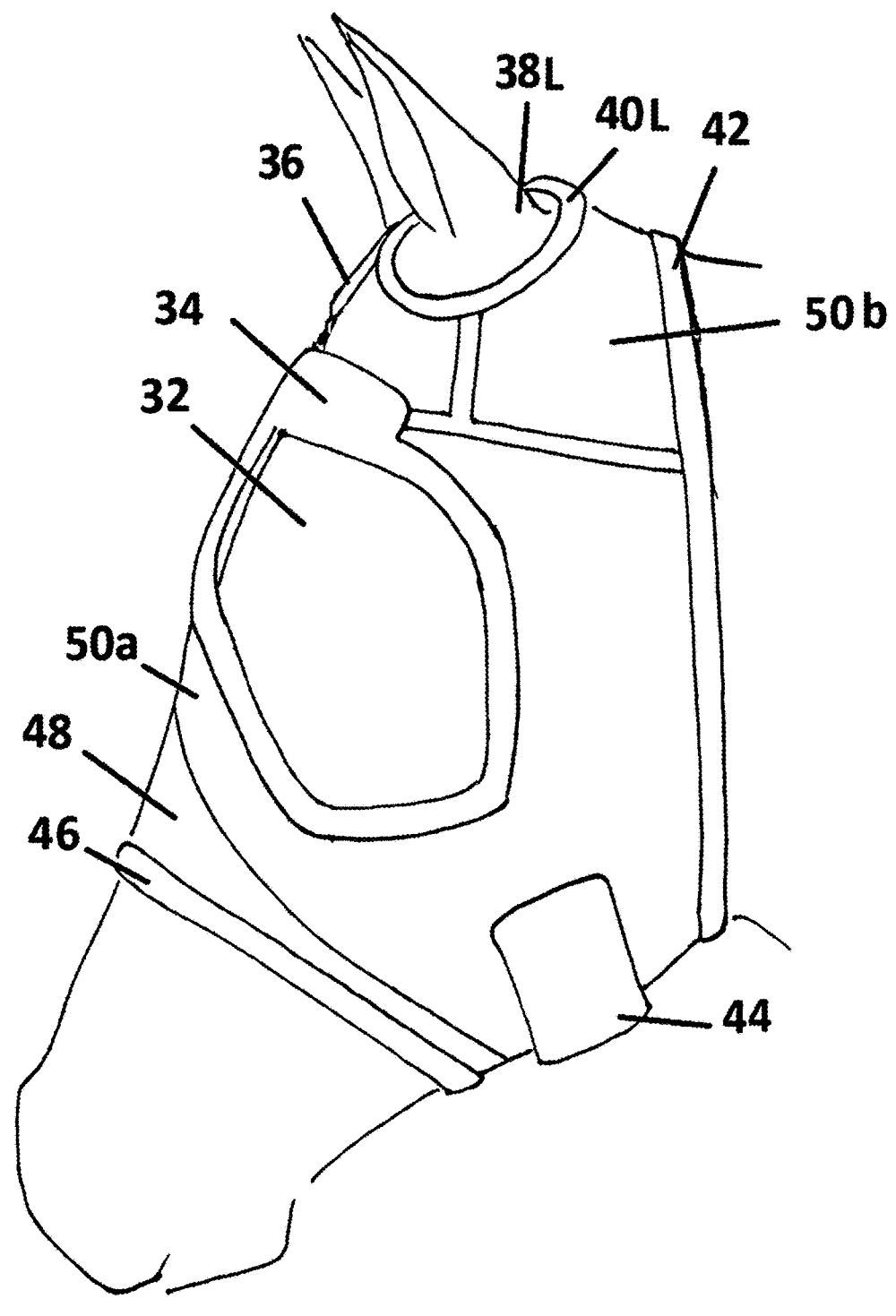
FIG. 7 is a side view of a pair of goggles of the invention for an animal like a horse.
Figure 8:
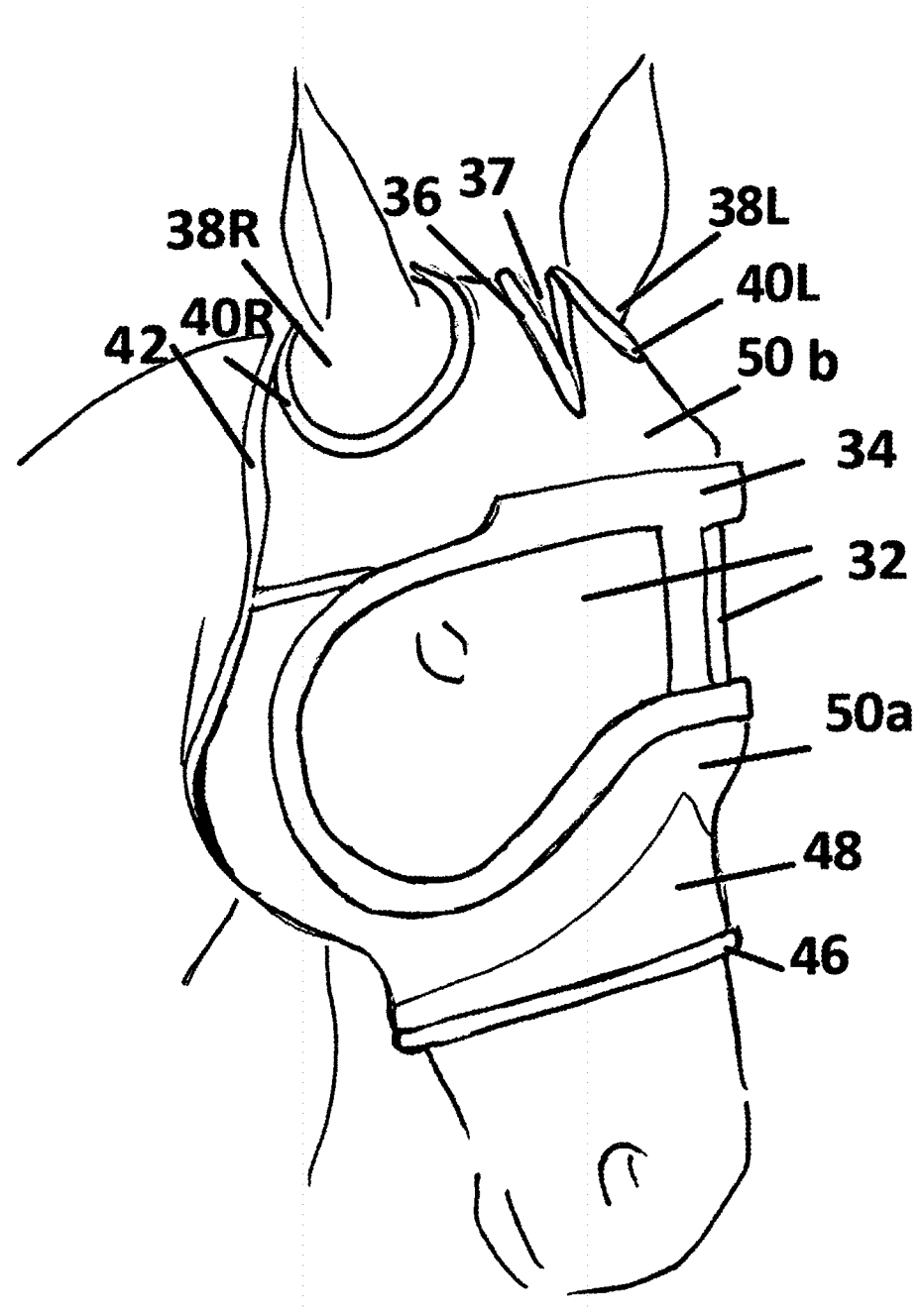
FIG. 8 is a perspective view of the horse and goggles shown in FIG. 7.
Figure 9:
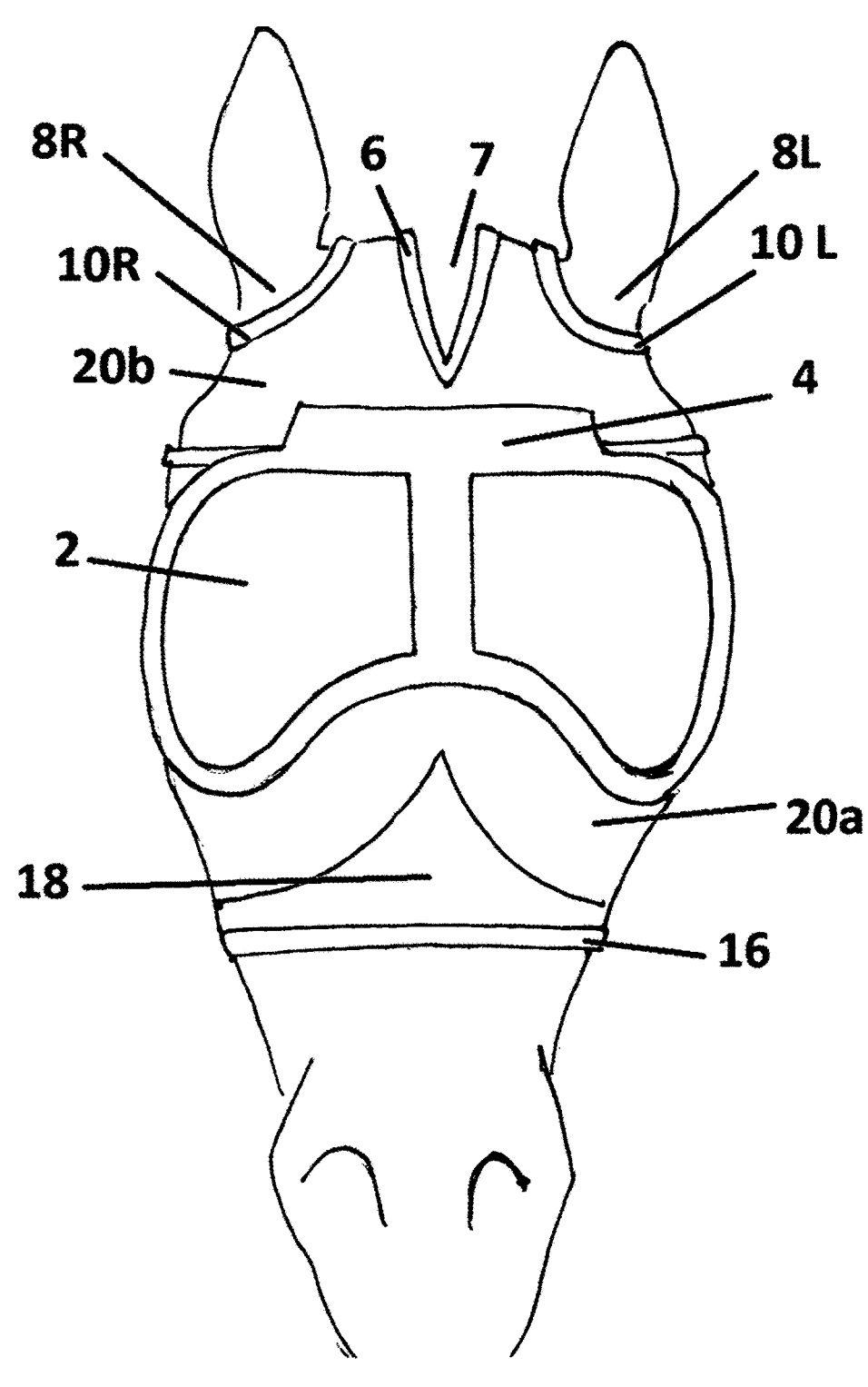
FIG. 9 is a front view of the horse and goggles shown in FIGS. 7 and 8.

FIGS. 7-9 show a typical blue light set of goggles 51 of the invention for an animal, e.g. an equine like a horse, according to the invention. FIG. 7, a side view of a horse wearing a typical pair of goggles of the invention including a flexible transparent polycarbonate lens 32, a suitable lens material being described earlier with respect to the masks of the invention, surrounded by a felt piece 34 attached in any suitable manner to, preferably an open mesh screen fabric 50a having thereon a hook and loop fastener 44. A top piece 50b, preferably a black mesh screen fabric, contains an optional opening 37 for a forelock, is attached to a middle piece 20a and has an outer border 42. A lower piece 48 of the goggles 51 is preferably a 2.5 oz. 75 denier polyester mesh screen material. The lower piece 48 has a border 46 around its lower end. The hook and loop piece 44 attached to the middle piece 50a operates like the fastener described above on the masks of the invention. Border pieces 36, 40L, 40R, 42, and 46 are preferably a 13.5 oz. polyester double sided artic fleece surrounding ear openings 38 L and 38R formed like explained above in the description of the masks of the invention.

FIG. 10, an opposite side view of the goggles 51 shown in FIG. 7, has ear opening 38L having a soft border 40L in a top piece 50a, the latter having a soft border 52 formed from a 13.5 oz. double sided artic fleece and going around the rear of the goggles 51. A center front piece 36 borders top piece 50a. A frame 34 for the blue light blocking (blb) material 32 is attached to a center portion 50c, a suitable shape for the blue light blocking material 32 can be seen in plan view in FIG. 11. A frame opening 34 is held closed on the goggles 51 and 50c with a hook and loop 35, 47. The hook and loop is made of well-known brand, Velcro® made by the Velcro® company. It usually comprises two components; two lineal fabric strips that are attached (sewn or otherwise adhered together) to the opposing surfaces to be fastened. The first component has tiny hooks protruding from the fabric strip and the second fabric strap has tiny loops protruding for the tiny hooks to lock onto until pulled apart to separate. A lower piece 48, a black mesh screen material, is sewn to the middle piece 50c and has a border 46, same kind as the border 40L. The opening 37 in the mask is the opening created by unfastening the hook and loop fastener to allow the mask to be pulled open to remove, or replace, the blue blocking lens or material 32. The goggles 51 are secured onto the horse with the Velcro® fastener 44.

There are several types of frames 33, 34 that are suitable for holding the blue light blocking (blb) material 32 as is apparent. The type described here is made using a Velcro® fastener. Another type can be a blb material holder, goggles frame. It is preferably made by injection molding of a flexible, somewhat elastic polymer. It can have a groove in the surface surrounding the opening for the blb lens or material, the groove or slot being such that the outer edge of the lens can fit into it to hold the lens, or material snugly in place. The elasticity of the polymer frame allows the blb lens or material to be inserted into the groove or slot. The goggle frame can be any color but usually is black, or either the same or contrasting color to the fabric surrounding the goggle frame.

Also, another feature of the invention is that the blb material, lens like that used in the masks and goggles described herein can be a laminate, bonded together, or unbonded1 and held together with another means like a Velcro® frame or other type of frame, one layer being a transparent, preferably flexible, plastic material and the other layer being the blb layer. Using such a laminate a thinner blb material can be used with a thicker, transparent layer providing support and the thinner blb layer providing the blue light blocking and good visibility functions. Also, a more rigid transparent layer, either due to a more rigid material or a thicker layer or both, will also function to prevent the blb layer from being pushed into the animal's eye, or eyes, by wind or other cause. Using this type of multiple layer lens material with a flexible, but preferably semi-rigid transparent layer, allows a thinner, such as thin as 5 mil or thinner, blb material to be used in the invention where suitable to produce the blb function(s) desired. The transparent material will be next to the eyes if the two layers are not bonded together, but if bonded together the thin blb layer can be next to the eyes if desired, or an outer layer. Photo 5 shows an example of a 14 mil blb blocking material laid on top of a transparent plastic layer.

FIGS. 12 and 13 show another mask of the invention fastened onto a horse, FIG. 12 being a side view and FIG. 13 being a front view. This mask 55 has ear holes 66 L and 66R, each having a soft border 68L and 68R, in a mask material 64. The mask 55 also has two eye holes 58L and 58R having a blue light blocking material 59 sewn onto the mask material 64, such as a black mesh screen material, as shown, the mask 55 also has a soft back border 70 and a soft front border 56 like the soft borders on the other masks and goggles. This masks differs from earlier masks shown and described by having one or more features in, around, on or in the blue blocking material for keeping the blue blocking lens or material from being pushed into the horse's eyes by wind or some other force, in the case of the mask of FIGS. 12 and 13, with two eye protecting lens, material stabilizers, or restrainers, 60aL and 60bL, which are preferably low-density polyethylene plastic strips about 0.5 inch wide by about 2 inches long, used to prevent the blue light blocking material from being pushed into the horse's eyes by wind or other thing. Any other type of restrainer that doesn't irritate the horse can be used instead of restrainers 60aL and 60bL.

While soft borders on the masks of the invention, e.g. around the ear holes, around the optional forelock opening, around the lower and upper, or back, ends of the masks are optional, but preferred for endurance and comfort. Also, while the forelock opening is optional it is also usually preferred. Also, while the forelock opening is preferred, full ear covers are another option for any of the masks or goggles used.

This masks and the goggles of the invention can use different types of blue light blocking material instead of the amber vinyl from the Tillman Company, so long as they block more than at least 50% of the blue light waves having wave lengths of form about 400 to about 500 or 511 or 551 nanometers. FIG. 14 shows how one of the blue light blocking materials described herein performs in blocking blue light. Visibility is affected in many blb materials by the thickness of the blb material. While 14 mil thick material was preferred in the masks and goggles described above, much thinner and much thicker blb material can be used, e.g. up to at least 40 mils or thicker, especially for uses where visibility is not very important. However, for those uses where visibility is important, the thinner thicknesses are preferred. The photographs 1-5 show colored pictures of the 14 mil blb material used in the preferred masks described above and also show the type of visibility of this 14 mil blb material and the lesser visibility in the same material, but 40 mils thick.

EXAMPLE 1 METHOD

Shielding a horse's eyes using a blue light-blocking mask or goggles of the invention. The purpose of this test was to prevent the portion of the electromagnetic spectrum having wave lengths in the range of about 400 nm to at least about 510 nm from artificial lights, e.g. overhead lights, etc., such as in a building, from entering the animal's, e.g. a horse's, eyes, thus reducing its melatonin levels normally released by the pineal gland of the horse. A mask of the type shown in FIGS. 1 and 2, the eye holes covered with the amber colored polyvinyl membrane from the Tillman Company were put onto the horse at the onset of normal night cycle, e.g. sunset, and removed at or close to sunrise, at least two hours prior to any competition, to allow the stimulatory effects of the blue light wavelengths. Wearing the mask 1, allows melatonin to rise by preventing these inhibitory wavelengths of light from reaching the eyes of the horse. This has several functions including signaling the body of the horse that it is dark outside, i.e. night time, has a calming effect on the horse and prepares it for rest and sleep. Following this procedure, or one close in proximity will produce a higher performing horse the next day, one that is more alert, and having greater energy and endurance.

EXAMPLE 2 METHOD

This procedure and mask or goggles of the invention can also be used on animals, e.g. horses and others, that are suffering from international travel and/or jet lag. In these cases the mask or goggles can be used to mimic the photoperiod (light/dark cycle) they are used to and then gradually transition to the actual current new photoperiod.

EXAMPLE 3 METHOD

A mask or goggles of the invention is applied mid-summer to shorten estrous and speed up winter anestrous by increasing melatonin earlier in the light period, mimicking day lengths of October. Once they have been consistently exposed to "short days" for a period of days, they can then be exposed to "long days" using artificial light sources in November to be ready to breed the upcoming year. Melatonin level functions as the signal for female animals like equines, e.g. horses, to go in, or out, of estrous depending upon a series of increasing daylight cycles (brings on estrous depending upon a series of increasing daylight cycles) or a series of decreasing daylight cycles (brings on anestrous). Applying the mask 1-2 hours prior to sunset to shorten the perceived length of daylight can facilitate bringing the animal, e.g. a mare, into anestrous more quickly—as melatonin level also functions as the signal for animals like equines, mares, to become fertile for breeding earlier in the breeding period.

EXAMPLE 4 METHOD

A mask or goggles of the invention can also be used to treat head-shaker syndrome. For example, the mask or goggles as described above, is applied to a seasonal head-shaker syndrome afflicted horses. The mask is applied two hours before sunset to mimic a shorter photoperiod and removed close to sunrise the next morning.

EXAMPLE 5 METHOD

The mask can also be used for horses that are being treated in hospital situations while under lights at night. A mask or goggles of the invention is applied at sunset and removed at or close to sunrise. This allows the normal melatonin level to rise at night to better mimic the horse's normal circadian rhythm By allowing the horse to maintain normal bio-rhythms and elevations in melatonin, rest and recovery is enhanced while the horse is in a stressful environment.

Different embodiments employing the concept and teachings of the invention will be apparent and obvious to those of ordinary skill in this art and these embodiments are likewise intended to be within the scope of the claims. For example, another possible option is to create a double layer using the 14 mil 601 over a heavier clear vinyl before sewing together. The heavier clear vinyl is readily available off the shelf with low minimums. Another example, while the drawings and descriptions show applying the inventions to an equine animal like a horse, the inventions are also applicable to other animals, particularly to large animals needing better relaxation, recovery, performance, and the like. The inventor does not intend to abandon any disclosed inventions that are reasonably disclosed but do not appear to be literally claimed below, but rather intends those embodiments to be included in the broad claims either literally or as equivalents to the embodiments that are literally included.

I claim:

1. A method of providing better rest for an equine animal, as indicated by a significant rise in the equine animal's melatonin level, by placing a pair of goggles or a mask on the equine animal and leaving it on the animal during the night, the goggles or mask having lens covering the eyes of the equine animal, the lens blocking at least some visible light waves only having wavelengths from about 400 to about 575 nanometers from reaching the equine animal's eyes.

2. The method of claim 1 wherein the lens material blocks about forty percent or more of the visible light waves having wavelengths in the range of about 400 to about 525 nanometers.

3. The method of claim 1 wherein the lens material blocks about one hundred percent of the visible light waves having wavelengths in the range of about 400 nanometers to about 510 nanometers.

4. The method of claim 1 wherein the lens material blocks about one hundred percent of visible light waves having wavelengths in the range of about 400 nanometers to about 510 nanometers and partially blocks light waves having wave lengths up to about 575 nanometers.

5. The method of claim 4 wherein the equine animal is a horse.

* * * * *